No. 734,101.

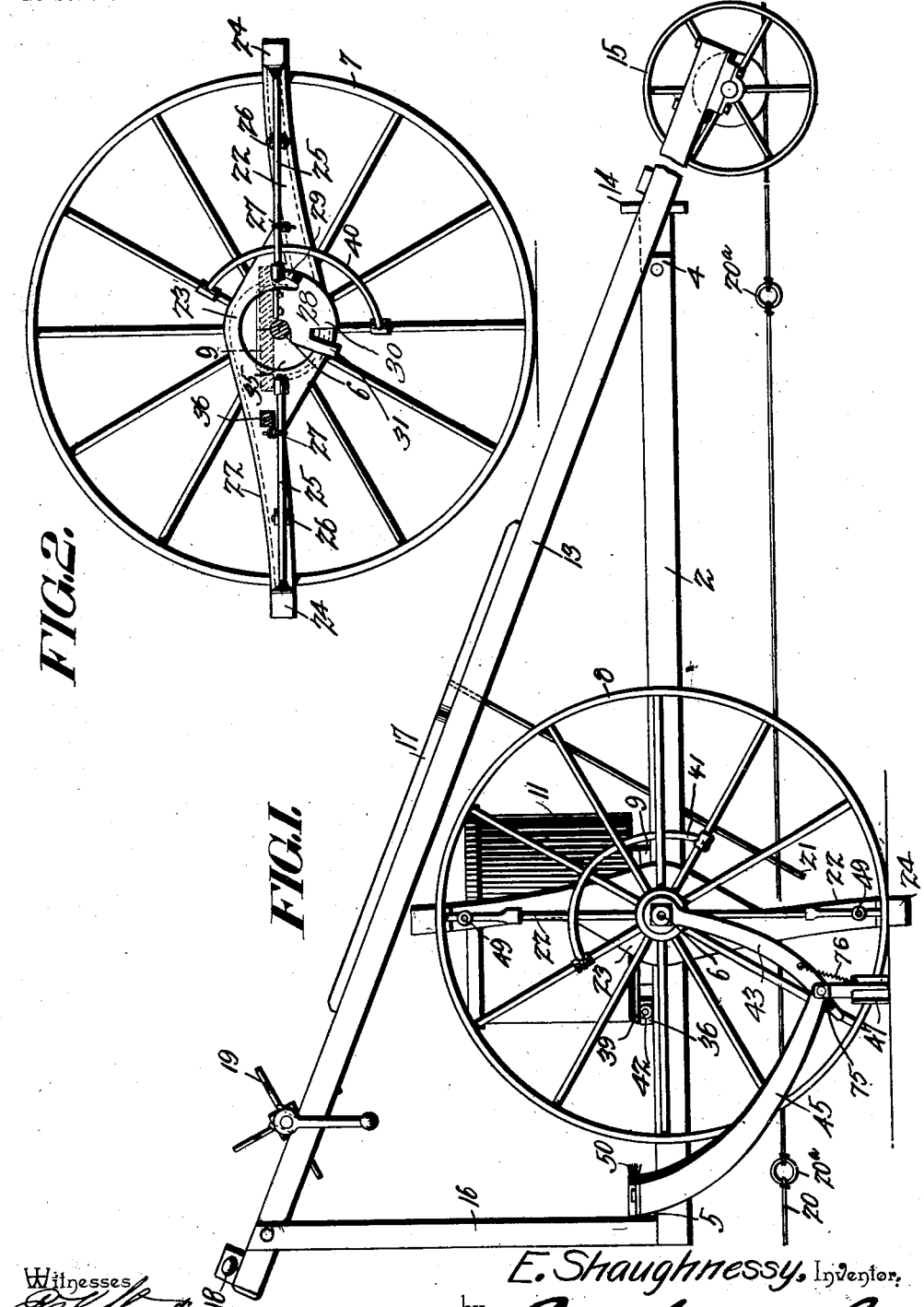

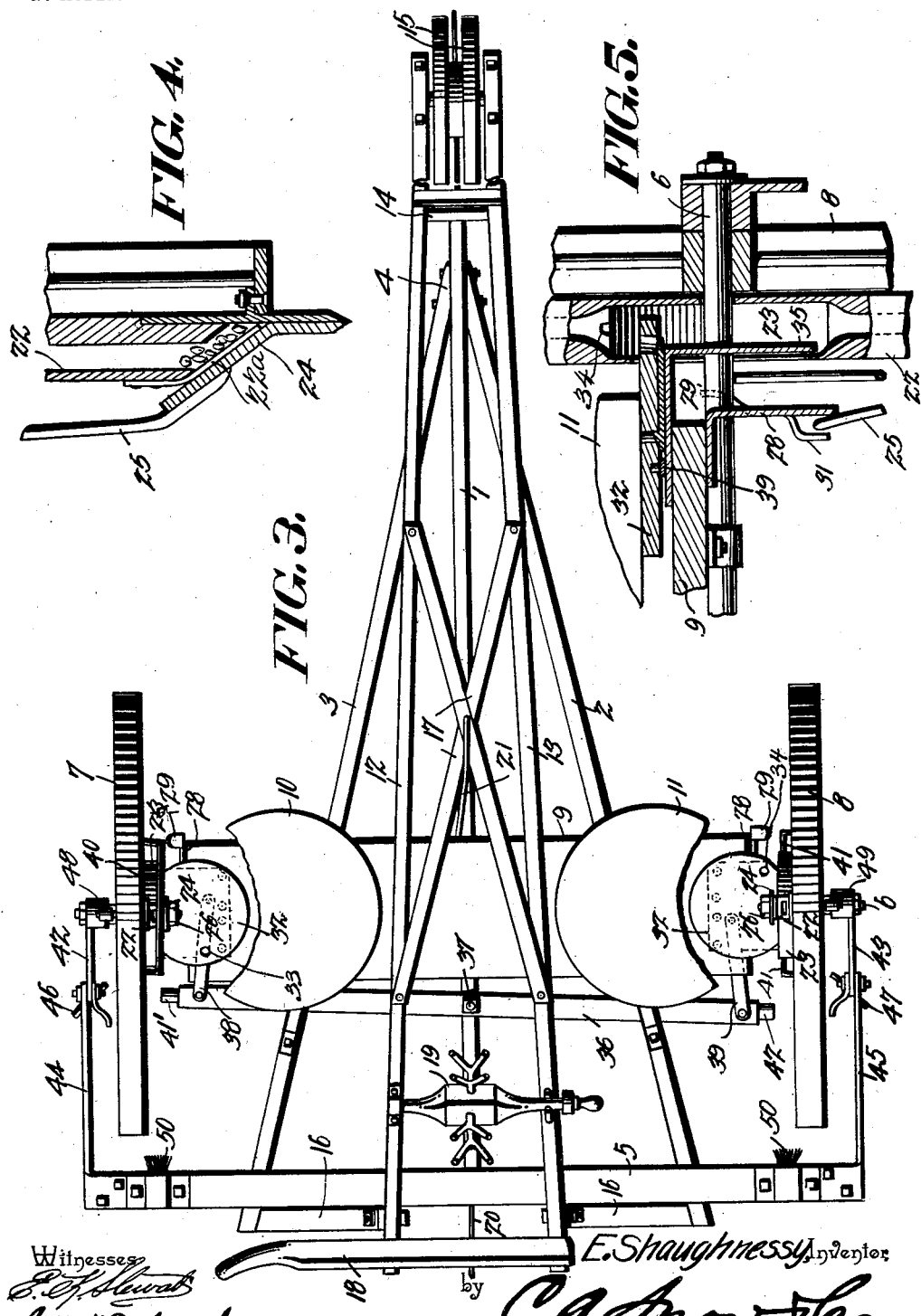

Patented July 21, 1903.

UNITED STATES PATENT OFFICE.

EMMA SHAUGHNESSY, OF TOMAH, WISCONSIN.

CHECK-ROW PLANTER.

SPECIFICATION forming part of Letters Patent No. 734,101, dated July 21, 1903.

Application filed March 10, 1902. Serial No. 97,565. (No model.)

*To all whom it may concern:*

Be it known that I, EMMA SHAUGHNESSY, a citizen of the United States, residing at Tomah, in the county of Monroe and State of Wisconsin, have invented a new and useful Check-Row Planter, of which the following is a specification.

This invention relates to seed planters or machines for planting grain or seeds, more particularly in drills or rows, and has for its object the production of an apparatus which will sow the grain in rows and without the necessity for the employment of a furrow-opener, but which will cover the grain after being sown.

Other objects of the invention will appear in the description and will be specifically pointed out in the claims.

In the drawings illustrative of the invention, Figure 1 is a side elevation of the device partially in section and also foreshortened. Fig. 2 is a side view of one of the combined traction and seed-dropper-tube-carrier wheels from the inside. Fig. 3 is a plan view of the apparatus as shown in Fig. 1. Fig. 4 is an enlarged sectional detail of a portion of the lower or discharge end of the seed-dropping device. Fig. 5 is an enlarged sectional detail illustrating the seed-feeding mechanism.

This device may be propelled either by hand or horse or other power, but for the purpose of illustration I have shown it adapted to be propelled by hand. The main framework consists of a central member 1 and two diagonally-disposed side members 2 and 3, united to the forward end of the central member, as at 4, and diverging rearwardly, and all three members united by a transverse beam 5, the latter extended laterally, as shown.

The axle is represented at 6 and is secured across the frame members 1, 2, and 3 and is provided on its ends with combined traction and seed-tube-carrier wheels 7 and 8, which preferably revolve with the axle.

Secured across the frame 1, 2, and 3, above the axle 6, is a plate 9, which carries the seed-boxes 10 and 11 and also supports the seed-feeding mechanism, as hereinafter described.

Above the lower framework comprised by the three members 1, 2, and 3 is another or upper framework consisting of two main side members 12 and 13, spaced apart and united by a transverse block 14 to the forward end of the central member 1 of the lower frame and extended forward and supporting a double guide-wheel 15 revolubly between their forward ends, as shown. The members 12 and 13 will be of any suitable length and will extend rearwardly and upwardly to a point above the rear cross-beam 5 and will be properly supported by vertical bars 16, suitably braced. The members 12 and 13 will be further strengthened and secured by intermediate diagonal braces 17, as shown.

Across the rear of the members 12 and 13 a handle-bar 18 will be secured, by which the machine may be guided.

A reel 19, on which the guide-wire 20 will be wound when not in use, is mounted upon the members 12 and 13 of the framework convenient for the operator.

The check-row wire is indicated at 20 and will be stretched across the field in the usual manner and will be provided with stops or knots 20$^a$ at regular intervals. These stops will preferably be rings inserted into the wire; but any other suitable form of stop may be employed, the object of these stops to be hereinafter explained.

The guide-wheel 15 will run over the wire 20, and thus serve as a guide to maintain the machine in a straight line.

The seed-planter mechanism is attached to the carrier or traction wheels 7 and 8, and consists in one or more tubular conductors or seed-droppers 22, arranged radially upon the wheels 7 and 8 and connected to their spokes, as shown. Any number of these seed-dropper tubes may be employed; but generally two will be sufficient, as shown. The inner ends of all the tubes 22 will merge tangentially into a common central chamber 23, as shown, the chamber opening inward at the center and being disposed concentrically around the axle 6, so that as the wheels and the series of dropper-tubes carried by them are revolved any charges of seed deposited in the chamber 23 will consecutively pass into the tubes 22 as they move downward in their revolutions. The arrangement whereby the seed-chutes 22 are tangentially connected to the chamber 23 is an important feature of my invention, as the seed are thereby conducted into the proper chute and no danger exists of the seed getting into the wrong chute. By the tangential arrangement it will be seen by reference to Fig. 2 that by no possible chance can the seed get into the chute when moving upward. At the outer end of each chute 22 is arranged a valve 24, adapted to be maintained normally open by a spring-actuated lever 25. Each lever is fulcrumed at 26 to its respective chute 22 and extended inwardly with its inner end moving in a circle near the center of the wheel and concentric thereto as the wheels and chutes revolve. The springs, which by exerting a pulling action upon the levers 25 are caused to maintain the valves normally open, are indicated at 27.

The seed-dropper chutes project beyond the peripheries of the traction-wheels 7 and 8, as shown, this projection representing the depth which the seed will be deposited, and when the valves 24 are closed, as in Fig. 4, the outer ends of the seed-chutes present a wedge-like form which will readily enter the soil. The extremity of the valve 24 is formed parallel to the corresponding extremity of the body of the chute for a short distance, as shown in Fig. 4, so that the portion which enters the soil is contracted to reduce the force necessary to insert it into the soil as well as to produce a form which will be more readily acted upon by the brushes 50, as hereinafter described.

Attached to the outer end of the outer side of the chute 22 is a spring-plate 22$^a$, which serves the double purpose of a metal chute or guide to the seed over the inner surface of the valve 24, but also as a supplemental spring force to assist the action of the spring 27 in actuating the valve. The plate 22$^a$ also serves as a wear-plate to protect the valve from the friction of the seed upon the valve. The life of the valve will be thus materially extended. When worn out, the spring-plates 22$^a$ can be easily and cheaply renewed at a much less expense than the valves 24. The mechanism will be so timed that the valve will be closed in time to receive and retain the seed and maintain the valve 24 closed until the seed-chute has reached its lowermost point and entered the soil to its full depth. At this point the mechanism will act to release the valve and permit the spring 27 to forcefully open the valve, pressing the earth to one side at the same time and permitting the seed to fall into the cavity thereby formed. This movement of the valve 24 is accomplished by means of a segmental cam-plate 28, attached to and depending from the transverse plate 9 and lying in the path of the inner ends of the levers 25, as shown. At the point where the valve-levers 25 first engage the cam-plates a portion of the latter is curved outward, as shown at 29, to guide the end of the valve-lever inward suddenly and close the valve. The face of the cam-segment 28 from the point 29 to the releasing-point 30 is in a vertical plane, so that the valve will be held firmly closed while passing over this portion of the cam-segment. This vertical portion corresponds to about one-fourth of the whole sweep of the seed-chute or while it is moving from a horizontal to a vertical position, so that the seed will be retained in the tube until the proper time for its discharge.

Projecting from the cam-plate 28 beyond the releasing-point 30 is a projection 31, adapted to act upon the end of the valve-lever and positively move it inward, and thus supplement the action of the spring 27 and insure the action if for any reason the spring fails to act.

The mechanism by which the charges of seeds are intermittently fed into the chambers 23 consists of disks 32, having seed-receiving pockets 33 and 34. These disks are mounted to oscillate upon the transverse plate 9, and the pockets or openings in said disks are so disposed as to move alternately into and out of the seedboxes, the movement being so timed that the delivery from said boxes will be into the chamber 23 of the oppositely-disposed seed-tubes as the said chambers pass below the said disks. Guard-plates 35 are disposed to conduct the seed properly into the chambers 23. It will thus be seen that seed is delivered into the tubes simultaneously and likewise simultaneously from the tubes to the ground.

The outer rims of the disks 32 project beyond the guide-plates 35, and the seed-pockets 33 34 of each disk will be alternately projected beyond these guard-plates and in position to deposit its contents into the chambers 23. Thus when the disks are vibrated the seeds deposited in the pockets thereof will be discharged into the chambers 23 and be correspondingly carried through and discharged from the seed-chutes 22.

The mechanism by which the disks 32 are intermittently oscillated consists of a lever 36, centrally pivoted at 37 upon the central member 1 of the lower frame and connected at each end to the disks 32 by links 38 39, so that as the lever is vibrated upon its pivot 37 the disks 32 will be correspondingly oscillated.

The ends of the lever 36 project into the paths of curved cams 40 41, one on each of the wheels 7 and 8 and arranged in diametrically opposite positions, so that they act alternately on the opposite ends of the lever.

The ends of the lever 36 will be provided with rollers 41' 42 to reduce the friction between them and the cam 40.

The cams 40 41 will be so adjusted as to properly coact with the cam-segment 28 to deliver the seed at just the proper time to the seed-chutes 22 to secure the requisite uniform results.

Projecting downward from the upper framework 12 13 is a wire or rod 21, whose lower end constantly engages the wire 20. The function of this rod is to denote to the operator whether the seeds are being dropped regularly or not by "clicking" upon the spaced rings or other obstructions 20ª upon the guide-wire 20, staked at opposite ends of the field. Thus the wire 20 being provided with the rings 20ª at regular intervals the rod 21 when it passes one of these obstructions will be thrown upward and to one side or agitated sufficiently to be noticeable by the operator, and if these clickings or agitations do not correspond to the actions of the planting means then the machine can be stopped, the rear end elevated until the wheels 15 rest on the ground and the traction-wheels 7 and 8 raised from the ground, and the machine then moved backward or forward until the relative positions of the stops 20ª and the discharge ends of the feed-chutes 22 correspond, when the process of planting may be continued. Thus the regularity of the planting and the uniformity of the rows or hills will be maintained.

Upon the ends of the axle adjacent to the traction-wheels 7 and 8 are mounted a pair of curved bars 42 and 43, extending downwardly and rearwardly and having connection at their lower ends with downwardly and forwardly curved bars or braces 44 and 45, the upper ends of which are attached to the extremities of the cross-beam 5. These bars 42 44 on the one side and 43 45 on the other side of the machine carry the covering devices 46 47. The latter consists of suitably-shaped blades having upwardly-extending shanks which are connected with the meeting ends of the bars 42 44 on the one side and 43 45 on the other side by means of the bolts or pins 75, whereby the said bars are connected and upon which the said covering devices will thus have a hinge or swinging movement. Springs 76 are arranged to throw the said coverers normally in a forward direction, so as to hold their lower edges in contact with the soil. When obstructions are encountered or when the coverers are actuated by mechanism to be presently described, the coverers will be thrown in a rearward direction against the tension of the springs.

The supporting-wheels of the machine are provided with suitably-located projections 48 49, which aline with the seed-tubes and which as the machine progresses over the field will contact with the coverers, thus raising the latter from the ground until the contact ceases, when the coverers will be restored by the tension of the springs to their normal position. It will be observed that this operation is timed to take place immediately after the seed-tubes leave the ground after depositing the seeds therein. The coverers when in their normal position will scrape along the surface of the ground and a portion of the dirt will be accumulated in front of them. Now the operation of raising the coverers by the means just described is timed to take place just as the point is reached where the seeds have been deposited.

By my improved covering device the covering-blades will accumulate in front of them a portion of dirt just sufficient to cover the seeds and to form a small mound or hill over the same. By raising the coverers from contact with the soil in the manner described exactly at the place of deposit the seeds will be efficiently covered from sight at the proper depth and there will be no danger of excessive covering, whereby the development might be checked.

Brushes 50 are attached to the cross-beam 5 and project into the paths of the outer or valve ends of the seed-chutes and with which the valves engage as the wheels revolve to remove any adhering soil or other matter from the valves and prevent any clogging from that source.

The apparatus may be constructed of any suitable material or of any required proportions, and the parts may be altered and changed in unimportant and minor details without departing from the principle or spirit of the invention, and I do not, therefore, wish to be limited to the precise construction shown in the various parts of the apparatus illustrated.

Having thus fully described my invention, what I claim as new, and desire to secure by Letters Patent, is—

1. In a seed-planter, the combination with a seed-tube of a spring-plate secured to the side thereof, and means for bending the said spring-plate under the said tube so as to close the discharge-opening thereof, substantially as set forth.

2. In a seed-planter, the combination with a seed-tube of a spring-plate, permanently attached thereto and means for bending the said spring-plate under the discharge-opening of the tube, and for temporarily retaining it in this position to form a support for the seeds to be deposited, substantially as set forth.

3. In a seed-planter, the combination with a seed-tube of a valve, and a spring-plate having permanent connection with said seed-tube and adapted to be bent under the discharge-opening thereof by the pressure of the valve, substantially as set forth.

4. In a seed-planter, the combination with a seed-tube of a spring-plate having permanent connection therewith near its lower end, and a valve adapted to press said spring-plate inward so as to close the discharge-opening of the seed-tube, said spring-plate serving to assist in the return movement of opening of the valve, substantially as set forth.

5. In a seed-planter, the combination with the framework and the seed-dropping mechanism supported thereby of a guide-wheel supporting the front end of the frame and a guide-wire engaging said guide-wheel, substantially as set forth.

6. In a seed-planter of the class described and carrying two sets of seed-dropping mechanism, the combination with the frame and seeding mechanism of a guide-wheel centrally supporting the front end of said frame, a guide-wire engaging said guide-wheel and having stops at regular intervals thereon, and means, carried by the frame, engaging the guide-wire and the stops thereon, and serving by engaging said stops to indicate irregularities in the performance of the seeding operation, substantially as set forth.

7. The combination of a frame-supporting seeding mechanism, a guide-wheel supporting the front end of said frame, a guide-wire engaging said guide-wheel and having stops formed thereon, and a wire spring attached to the frame and having constant engagement with one side of the guide-wire so as to be clicked by its passage over the stops thereon, substantially as set forth.

8. In a seeding-machine, a supporting-framework, traction-wheels carried by said framework, seed-dropper chutes carried by said traction-wheels, means for causing charges of seeds to be intermittently fed to and discharged from said chutes, a guide-wheel carried by said framework, a guide-wire engaged by said guide-wheel, stops at intervals upon said guide-wire, and a rod carried by said framework and engaging said wire and adapted to be vibrated by said stops, whereby the action of the seed-dropper chutes may be noted, substantially as described.

9. In a seeding-machine, a main frame formed of members diverging from the forward part toward the rear part, an axle carried by said framework at its wider part, traction-wheels upon said axle and having seed-dropper chutes disposed thereon, means for causing charges of seeds to be intermittently fed to and discharged from said chutes, a supplemental framework connected to the forward narrower end of said main frame and projecting in advance thereof and extending rearwardly and upwardly therefrom and connected to the rear of said main frame, a guide-wheel carried by the forward end of said supplemental frame, and a guide-wire adapted to be engaged by said guide-wheel, substantially as described.

10. In a seed-planter, the combination of the supporting-wheels, the seed-tubes mounted tangentially thereon and opening at their inner ends into a centrally-disposed receiving-chamber, a cross-beam supported upon the axle and having guide-plates extending into said receiving-chambers, the seed-disks mounted upon the ends of the cross-beam and having seed-cups adapted to be thrown into alinement with the receiving-chambers, the seedboxes arranged above the seed-disks, and means for oscillating the latter, substantially as set forth.

11. In a seed-planter, the combination of the traction-wheels, seed-tubes carried thereby, means for supplying seeds to the said tubes, means for releasing the seed from said tubes, a frame supporting the seedboxes, supporting-brackets connected with each other and with the frame and the axle of the machine, coverers having shanks hinged at the connecting-points of said brackets, means for holding said coverers normally in contact with the ground, and means connected with the traction-wheels for elevating said coverers from such contact at the points of deposit of the seeds, substantially as set forth.

In testimony that I claim the foregoing as my own I have hereto affixed my signature in the presence of two witnesses.

EMMA SHAUGHNESSY.

Witnesses:
PATRICK SHAUGHNESSY,
H. M. SOWLE.